US012266304B2

(12) United States Patent
Lee et al.

(10) Patent No.: US 12,266,304 B2
(45) Date of Patent: Apr. 1, 2025

(54) DISPLAY DEVICE AND METHOD OF DRIVING THE SAME

(71) Applicant: SAMSUNG DISPLAY CO., LTD., Yongin-si (KR)

(72) Inventors: Jaehoon Lee, Seoul (KR); Byoungkwan An, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/051,394

(22) Filed: Oct. 31, 2022

(65) Prior Publication Data

US 2023/0092609 A1 Mar. 23, 2023

Related U.S. Application Data

(63) Continuation of application No. 17/366,889, filed on Jul. 2, 2021, now Pat. No. 11,488,532.

(30) Foreign Application Priority Data

Aug. 25, 2020 (KR) ........................ 10-2020-0107364

(51) Int. Cl.

*G09G 3/3233* (2016.01)
*G09G 3/20* (2006.01)
*G09G 3/3291* (2016.01)

(52) U.S. Cl.

CPC ......... *G09G 3/3233* (2013.01); *G09G 3/2092* (2013.01); *G09G 3/3291* (2013.01); *G09G 2310/061* (2013.01); *G09G 2320/0233* (2013.01); *G09G 2330/021* (2013.01)

(58) Field of Classification Search

CPC .. G09G 3/3233; G09G 3/2092; G09G 3/3291; G09G 2310/061; G09G 2320/0233; G09G 2330/021; G09G 2360/16; G09G 2320/029; G09G 2320/043; G09G 2320/0693

See application file for complete search history.

(56) References Cited

U.S. PATENT DOCUMENTS

| | | | |
|---|---|---|---|
| 10,223,972 | B1 | 3/2019 | Kuang et al. |
| 10,964,274 | B2 | 3/2021 | Kang |
| 2003/0122813 | A1 | 7/2003 | Ishizuki et al. |
| 2004/0183752 | A1 | 9/2004 | Kawasaki et al. |
| 2006/0077135 | A1 | 4/2006 | Cok et al. |
| 2006/0284082 | A1 | 12/2006 | Furnemont |

(Continued)

FOREIGN PATENT DOCUMENTS

| | | | |
|---|---|---|---|
| KR | 10-2017-0077965 | A | 7/2017 |
| KR | 10-2017-0080889 | A | 7/2017 |

(Continued)

*Primary Examiner* — Jose R Soto Lopez

(74) *Attorney, Agent, or Firm* — Womble Bond Dickinson (US) LLP

(57) ABSTRACT

A display device includes a display panel including a plurality of pixels, a sensing circuit to measure a sensing current value of each of the pixels during a frame period, wherein the frame period includes an active period and a blank period following the active period, and a driving controller to calculate a deterioration weight based on the sensing current value and a reference current value, and to generate output image data by applying the deterioration weight to input image data.

12 Claims, 8 Drawing Sheets

(56) References Cited

U.S. PATENT DOCUMENTS

| | | | | |
|---|---|---|---|---|
| 2006/0284802 | A1 | 12/2006 | Kohno | |
| 2007/0152921 | A1* | 7/2007 | Osame | G09G 3/3258 345/76 |
| 2014/0022289 | A1 | 1/2014 | Lee et al. | |
| 2014/0176525 | A1* | 6/2014 | Woo | G09G 3/3233 345/212 |
| 2014/0176622 | A1 | 6/2014 | Jung et al. | |
| 2015/0035734 | A1 | 2/2015 | Lee et al. | |
| 2015/0042688 | A1 | 2/2015 | Kim | |
| 2015/0130866 | A1 | 5/2015 | Bae et al. | |
| 2015/0138177 | A1 | 5/2015 | Kwon et al. | |
| 2015/0154912 | A1 | 6/2015 | Hong | |
| 2015/0187268 | A1 | 7/2015 | Tani et al. | |
| 2015/0213757 | A1 | 7/2015 | Takahama et al. | |
| 2015/0325174 | A1 | 11/2015 | Yu et al. | |
| 2016/0012800 | A1 | 1/2016 | Han et al. | |
| 2016/0086548 | A1 | 3/2016 | Maeyama | |
| 2016/0163261 | A1 | 6/2016 | Kim et al. | |
| 2017/0039933 | A1 | 2/2017 | Shin | |
| 2017/0039939 | A1 | 2/2017 | Chaji | |
| 2017/0039953 | A1 | 2/2017 | Lee | |
| 2017/0053587 | A1 | 2/2017 | Kim et al. | |
| 2017/0061871 | A1 | 3/2017 | Xiang et al. | |
| 2017/0124947 | A1 | 5/2017 | Kim et al. | |
| 2017/0162226 | A1 | 6/2017 | Yamanaka | |
| 2018/0053462 | A1 | 2/2018 | Bae et al. | |
| 2018/0061292 | A1 | 3/2018 | Hong et al. | |
| 2018/0090062 | A1 | 3/2018 | Nakamura | |
| 2018/0114815 | A1 | 4/2018 | Lee et al. | |
| 2018/0144689 | A1 | 5/2018 | Hong et al. | |
| 2018/0144705 | A1 | 5/2018 | Lee et al. | |
| 2018/0342193 | A1 | 11/2018 | Shen et al. | |
| 2019/0012948 | A1 | 1/2019 | Ohara et al. | |
| 2019/0088199 | A1 | 3/2019 | Zhang et al. | |
| 2019/0088204 | A1 | 3/2019 | Zhang et al. | |
| 2019/0164484 | A1 | 5/2019 | Yeo et al. | |
| 2019/0180693 | A1 | 6/2019 | Kim | |
| 2019/0197959 | A1* | 6/2019 | Noh | G09G 3/3233 |
| 2020/0043421 | A1 | 2/2020 | Kang et al. | |
| 2020/0051499 | A1 | 2/2020 | Chung et al. | |
| 2020/0105195 | A1 | 4/2020 | Song et al. | |
| 2020/0160781 | A1 | 5/2020 | Park | |
| 2020/0175919 | A1 | 6/2020 | Hong et al. | |
| 2020/0184902 | A1 | 6/2020 | Kim | |
| 2020/0202796 | A1 | 6/2020 | Lee et al. | |
| 2020/0214127 | A1 | 7/2020 | Choi et al. | |
| 2020/0410931 | A1 | 12/2020 | Li | |
| 2021/0043145 | A1 | 2/2021 | Li | |
| 2021/0193039 | A1 | 6/2021 | Piao et al. | |
| 2021/0201797 | A1 | 7/2021 | Lee et al. | |
| 2021/0201815 | A1* | 7/2021 | Bong | G09G 3/3266 |
| 2021/0202673 | A1* | 7/2021 | Kim | H10K 59/1216 |
| 2021/0407403 | A1 | 12/2021 | Yin | |
| 2021/0407437 | A1 | 12/2021 | Jang et al. | |

FOREIGN PATENT DOCUMENTS

| | | | |
|---|---|---|---|
| KR | 10-2018-0025038 | A | 3/2018 |
| KR | 10-2019-0142124 | A | 12/2019 |
| KR | 10-2020-0053785 | A | 5/2020 |

* cited by examiner

DISPLAY DEVICE AND METHOD OF DRIVING THE SAME

CROSS-REFERENCE TO RELATED APPLICATIONS

This application is a continuation of U.S. patent application Ser. No. 17/366,889, filed Jul. 2, 2021, which claims priority to and the benefit of Korean Patent Application No. 10-2020-0107364, filed Aug. 25, 2020, the entire content of both of which is incorporated herein by reference.

BACKGROUND

1. Field

Embodiments of the present disclosure generally relate to a display device.

2. Description of Related Arts

A display device includes a plurality of pixels, and the pixels emit light with various luminances so that the display device may display an image. Each of the pixels may include a pixel circuit having substantially the same structure. However, while the user uses the display device, the degree of deterioration of the pixel may be different for each pixel according to a position of the pixel and the degree of use of the pixel. Accordingly, in order to improve the display quality of the display device, the degree of deterioration of the pixel may be compensated for each pixel position, and at the same time, the degree of deterioration of the pixel may be compensated in real time according to the degree of use of the pixel.

The above information disclosed in this Background section is only for understanding of the background of the inventive concepts, and, therefore, it may contain information that does not constitute prior art.

SUMMARY

Some embodiments provide a display device with improved display quality.

Some embodiments provide a method of driving the display device.

A display device according to an embodiment may include a display panel including a plurality of pixels, a sensing circuit to measure a sensing current value of each of the pixels during a blank period, wherein a frame period includes an active period and the blank period following the active period, and a driving controller to calculate a deterioration weight based on the sensing current value and a reference current value, and to generate output image data by applying the deterioration weight to input image data.

According to an embodiment, the driving controller may calculate a block sensing current value of a pixel block based on the sensing current values. The pixel block may include pixels from among the plurality of pixels.

According to an embodiment, the block sensing current value may be an average value of the sensing current values.

According to an embodiment, the block sensing current value may be a maximum sensing current value from among the sensing current values of the pixels in the pixel block.

According to an embodiment, the driving controller may calculate a block deterioration weight of the pixel block based on the block sensing current value and the reference current value of the pixels in the pixel block.

According to an embodiment, the driving controller may generate the output image data by applying the block deterioration weight to the input image data.

According to an embodiment, the pixel block may have a same emission luminance during a first frame period and a second frame period following the first frame period, and the block deterioration weight of the second frame period may be greater than the block deterioration weight of the first frame period.

According to an embodiment, wherein the deterioration weight may be calculated based on a ratio of the sensing current value and the reference current value.

According to an embodiment, each of the pixels may include a first transistor including a control terminal connected to a first node, a first terminal connected to a first power source, and a second terminal connected to a second node, a second transistor including a control terminal connected to a first scan line, a first terminal connected to a data line, and a second terminal connected to the first node, a third transistor including a control terminal connected to a second scan line, a first terminal connected to the second node, and a second terminal connected to a sensing line, and an organic light emitting diode including a first terminal connected to the second node and a second terminal connected to a second power source.

According to an embodiment, a turn-on voltage for turning on the third transistor may be provided to the second scan line during the blank period.

According to an embodiment, the blank period may include a first blank period and a second blank period following the first blank period. A turn-on voltage for turning on the second transistor may be provided to the first scan line during the first blank period, and a turn-off voltage for turning off the second transistor may be provided to the first scan line during the second blank period.

According to an embodiment, an initialization voltage may be provided to the sensing line during the first blank period, and a reference voltage may be provided to the sensing line during the second blank period.

According to an embodiment, the driving controller may calculate a pixel deterioration weight of each of the pixels based on the sensing current value of each of the pixels and the reference current value.

According to an embodiment, driving controller may generate the output image data by applying the pixel deterioration weight to the input image data.

A method of driving a display device according to an embodiment may include measuring a sensing current value of each of pixels in a display panel of the display device during a blank period, wherein a frame period includes an active period and the blank period following the active period, calculating a deterioration weight based on the sensing current value of the pixel and a reference current value, generating output image data by applying the deterioration weight to input image data, and generating a data voltage based on the output image data and outputting the data voltage to the pixels.

According to an embodiment, the method may further include calculating a block sensing current value of a pixel block based on the sensing current values, wherein the pixel block includes the pixels.

According to an embodiment, the block sensing current value may be an average value of the sensing current values of the pixels in the pixel block.

According to an embodiment, the block sensing current value may be a maximum sensing current value from among the sensing current values of the pixels in the pixel block.

According to an embodiment, a block deterioration weight of the pixel block may be calculated based on the block sensing current value and the reference current value.

According to an embodiment, the output image data may be generated by applying the block deterioration weight in the input image data.

According to an embodiment, the pixel block may have a same emission luminance during a first frame period and a second frame period following the first frame period, and the block deterioration weight of the second frame period may be greater than the block deterioration weight of the first frame period.

According to an embodiment, the deterioration weight may be calculated based on a ratio of the sensing current value of the pixel and the reference current value.

According to an embodiment, each of the plurality of pixels may include a first transistor including a control terminal connected to a first node, a first terminal connected to a first power source, and a second terminal connected to a second node, a second transistor including a control terminal connected to a first scan line, a first terminal connected to a data line, and a second terminal connected to the first node, a third transistor including a control terminal connected to a second scan line, a first terminal connected to the second node, and a second terminal connected to a sensing line, and an organic light emitting diode including a first terminal connected to the second node and a second terminal connected to a second power source.

According to an embodiment, the method may further include turning on the third transistor by providing a turn-on voltage for turning on the third transistor to the second scan line during the blank period.

According to an embodiment, the blank period may include a first blank period and a second blank period following the first blank period. The method may further include turning on the second transistor by providing a turn-on voltage for turning on the second transistor to the first scan line during the first blank period, and turning off the second transistor by providing a turn-off voltage for turning off the second transistor to the first scan line during the second blank period.

According to an embodiment, the method may further include providing an initialization voltage to the sensing line during the first blank period and providing a reference voltage to the sensing line during the second blank period.

According to an embodiment, the deterioration weight of each of the plurality of pixels may be calculated based on the sensing current value of the pixel and the reference current value.

According to an embodiment, the output image data may be generated by applying the deterioration weight to the input image data.

Therefore, a display device according to embodiments of the present disclosure may compensate for a degree of deterioration for each position of the pixel by measuring a sensing current for each pixel. Further, the display device may compensate for the degree of deterioration in real time according to a degree of use of the pixel by measuring the sensing current of the pixel for each blank period of a frame period.

It is to be understood that both the foregoing general description and the following detailed description are examples and explanatory and are intended to provide further explanation of the embodiments of the present disclosure as claimed.

BRIEF DESCRIPTION OF THE DRAWINGS

The accompanying drawings, which are included to provide a further understanding of the embodiments of the present disclosure are a part of the present disclosure, illustrate embodiments of the present disclosure, and together with the description serve to explain various embodiments of the present disclosure.

DETAILED DESCRIPTION

Figure 1:
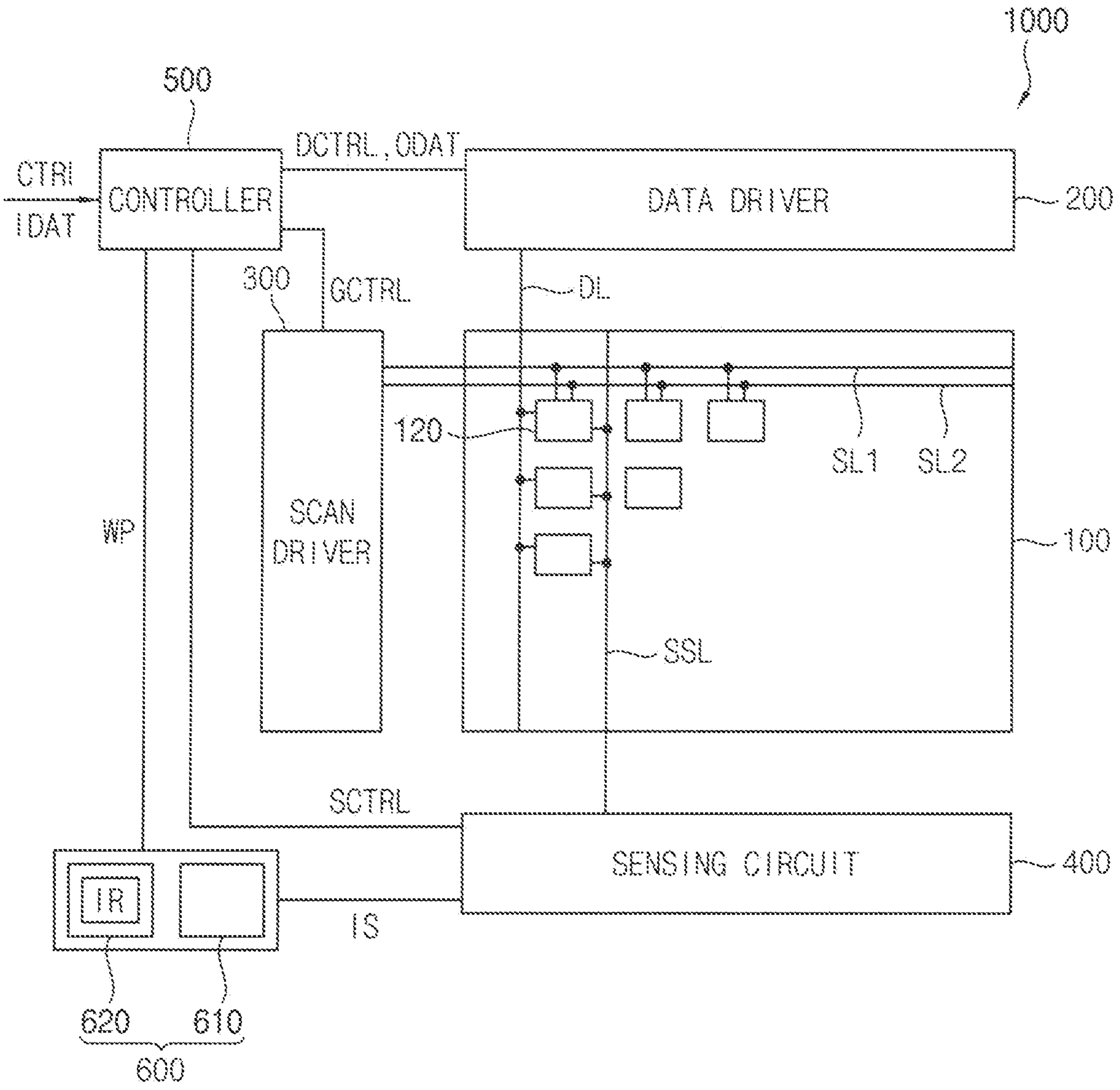
FIG. 1 is a diagram illustrating a display device according to an embodiment.

Illustrative, non-limiting embodiments will be more clearly understood from the following detailed description in conjunction with the accompanying drawings.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms “a” and “an” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list. Further, the use of “may” when describing embodiments of the present disclosure refers to “one or more embodiments of the present disclosure”. Also, the term “exemplary” is intended to refer to an example or illustration. As used herein, the terms “use,” “using,” and “used” may be considered synonymous with the terms “utilize,” “utilizing,” and “utilized,” respectively.

It will be understood that when an element or layer is referred to as being “on”, “connected to”, “coupled to”, or “adjacent to” another element or layer, it may be directly on, connected to, coupled to, or adjacent to the other element or layer, or one or more intervening elements or layers may be present. In contrast, when an element or layer is referred to as being “directly on”, “directly connected to”, “directly coupled to”, or “immediately adjacent to” another element or layer, there are no intervening elements or layers present.

Any numerical range recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Figure 2:
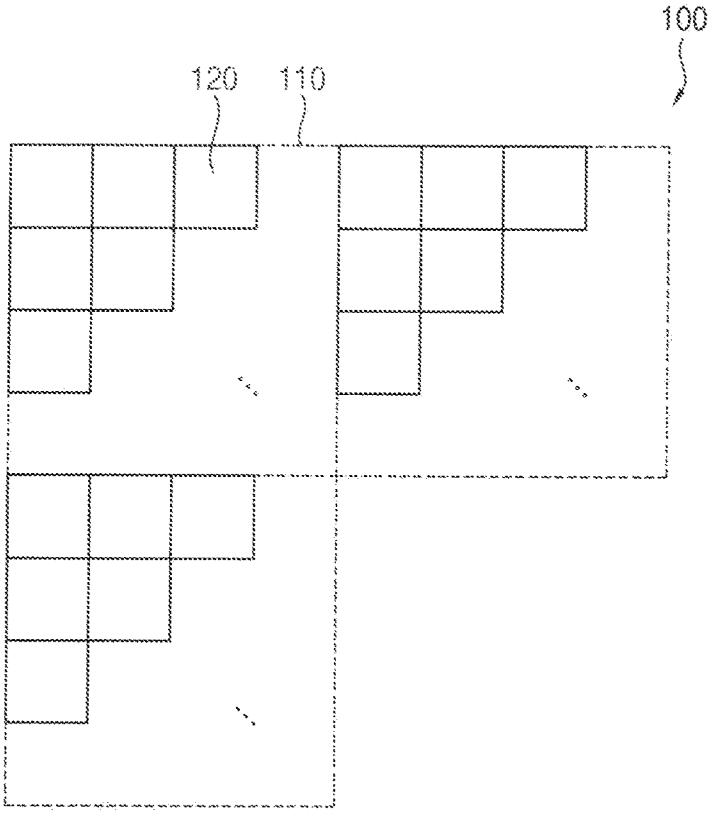
FIG. 2 is a diagram illustrating a pixel block included in the display device of FIG. 1.

FIG. 1 is a diagram illustrating a display device according to an embodiment. FIG. 2 is a diagram illustrating a pixel block included in the display device of FIG. 1.

Referring to FIGS. 1 and 2, a display device 1000 according to an embodiment of the present disclosure may include a display panel 100, a data driver 200, a scan driver 300, a sensing circuit 400, and a driving controller (e.g., a timing controller). The driving controller may include a controller 500 and a compensator 600, and the compensator 600 may include a block sensing current value calculator 610 and a deterioration weight calculator 620.

The display panel 100 may include a plurality of pixel blocks 110, and each of the pixel blocks 110 may include a plurality of pixels 120.

The pixel block 110 may be a virtual element defining a unit for controlling the pixel 120. The pixel block 110 may be set (e.g. fixedly set) in a process of manufacturing the display device 1000 or may be updated in a process of using the display device 1000.

In an embodiment, each of the pixel blocks 110 may include the same (or substantially the same) number of the pixels 120, and the pixel blocks 110 may not overlap each other. In an embodiment, each of the pixel blocks 110 may include a different number of the pixels 120. In an embodiment, the pixel blocks 110 may overlap each other. In this case, the pixel blocks 110 may share the same pixel.

The pixel 120 may be connected to a data line DL, a first scan line SL1, a second scan line SL2, a sensing line SSL, a first power source ELVDD line, and a second power source ELVSS line. The pixel 120 may receive voltages and signals from the above-described lines. As the pixel 120 emits light corresponding to the received voltage and the signals, the display device 1000 may display an image.

The data driver 200 may generate a data voltage based on output image data ODAT and a data control signal DCTRL provided from the controller 500. For example, the data control signal DCTRL may include output data enable signal, a horizontal start signal, and a load signal. For example, the output image data ODAT may be generated by reflecting a deterioration weight WP in input image data IDAT. In other words, the output image data ODAT may be generated by applying the deterioration weight WP to the input image data IDAT. In an embodiment, the data driver 200 may generate the data voltage based on the output image data ODAT during an active period included in a frame period, and may generate a blank data voltage during a blank period following the active period. The data voltage and the blank data voltage may be provided to the pixels 120 through the data lines DL.

In an embodiment, the data driver 200 may be implemented with one or more integrated circuits (“IC”s). In another embodiment, the data driver 200 may be directly mounted on the display panel 100, may be connected to the display panel 100 in a COF (chip on film) form, or may be integrated into a peripheral portion of the display panel 100.

The scan driver 300 may generate a scan signal based on a gate control signal GCTRL provided from the controller 500. For example, the gate control signal GCTRL may include a vertical start signal and a clock signal. In an embodiment, the scan driver 300 may include a plurality of stages configured in a form of a shift register. For example, the scan driver 300 may generate a scan signal by sequentially transmitting the scan signal having a turn-on voltage to a next stage according to the clock signal.

In an embodiment, the scan driver 300 may include a first scan driver and a second scan driver. In some embodiments, the scan signal may include a first scan signal and a second scan signal. For example, the first scan signal may be provided to the first scan line SL1, and the second scan signal may be provided to the second scan line SL2. In this case, the first scan driver and the second scan driver may be driven independently. Accordingly, when the first scan signal has a turn-on voltage, the second scan signal may have a turn-on voltage or a turn-off voltage.

In an embodiment, the scan driver 300 may be directly mounted on the display panel 100. In another embodiment, the scan driver 300 may be integrated in the display panel 100 or may be connected to the display panel 100 in the form of a COF.

The controller 500 may receive input image data IDAT and a control signal CTRL from an external processor (e.g., GPU). For example, the input image data IDAT may be RGB data including red image data, green image data, and blue image data. In some embodiments, the control signal CTRL may include a vertical synchronization signal, a horizontal synchronization signal, an input data enable signal, a master clock signal, and the like.

In some embodiments, the controller 500 may receive the deterioration weight WP from the compensator 600. In an embodiment, the controller 500 may generate the output image data ODAT based on the input image data DAT and the deterioration weight WP. In some embodiments, the controller 500 may generate the data control signal DCTRL, the gate control signal GCTRL, and a sensing control signal SCTRL, based on the control signal CTRL.

The sensing circuit 400 may measure a sensing current value IS of each of the pixels 120 in response to the sensing control signal SCTRL provided from the controller 500. For example, the sensing circuit 400 may measure the sensing current value IS of each of the pixels 120 during the blank period. For example, the sensing current value IS may indicate a degree of deterioration of the pixel 120. For example, the sensing current value IS may increase as the pixel 120 deteriorates.

In some embodiments, the sensing circuit 400 may provide an initialization voltage (e.g., an initialization voltage VINT of FIG. 4) or a reference voltage (e.g., a reference voltage VREF of FIG. 4) to the pixel 120 based on the sensing control signal SCTRL. For example, the sensing circuit 400 may provide the initialization voltage VINT to the pixel 120 during a first blank period included in the blank period, and may provide the reference voltage VREF to the pixel 120 during a second blank period included in the blank period.

In an embodiment, as shown in FIG. 1, the data driver 200 and the sensing circuit 400 may be formed separately. In another embodiment, the data driver 200 and the sensing circuit 400 may be integrally formed.

The compensator 600 may calculate the deterioration weight WP based on the sensing current value IS and a reference current value IR (e.g., a preset reference currently value IR). The compensator 600 may output the deterioration weight WP to the controller 500.

The reference current value IR may be a current value of a sensing current value measured by the sensing circuit 400 when reference output image data ODAT is generated. For example, the controller 500 may generate the reference output image data ODAT without reflecting the deterioration weight WP in a reference input image data. For example, the reference current value IR may be measured through a standard reference display device and stored in the compensator 600, or may be measured by the sensing circuit 400 whenever the display device 1000 is turned on.

The deterioration weight WP may be a parameter indicating a characteristic variation of each position of the pixel 120. For example, the deterioration weight WP may be calculated by the following [Equation 1].

$$WP = \left(\frac{IS}{IR}\right)^{\beta} \quad \text{[Equation 1]}$$

Here, WP is the deterioration weight, IS is the sensing current value, IR is the reference current value, and β is a current acceleration coefficient. The current acceleration coefficient may be stored in the compensator 600 in a process of manufacturing the display device 1000 or may be updated in a process of using the display device 1000.

As described above, the controller 500 may generate the output image data ODAT by reflecting the deterioration weight WP in the input image data IDAT. In some embodiments, the data driver 200 may generate the data voltage based on the output image data ODAT in which the deterioration weight WP is reflected.

In an embodiment, the sensing circuit 400 may measure the sensing current values IS of the pixels 120. In some embodiments, the block sensing current value calculator 610 may calculate a block sensing current value of the pixel block 110 based on the sensing current values IS. In an embodiment, the block sensing current value may be an average value of the sensing current values IS of the pixels 120 included in the pixel block 110. In an embodiment, the block sensing current value may be a maximum sensing current value from among the sensing current values IS of the pixels 120 included in the pixel block 110. As described above, because the sensing current value IS may increase as the pixel 120 deteriorates, the maximum sensing current value may be a sensing current value of a pixel having the largest degree of deterioration from among the pixels 120 included in the pixel block 110.

The deterioration weight calculator 620 may calculate a block deterioration weight of the pixel block 110 based on the block sensing current value and the reference current value IR. In some embodiments, the controller 500 may generate the output image data ODAT by reflecting the block deterioration weight in the input image data IDAT. In this case, the display device 1000 may reduce an amount of computation required for compensation of deterioration.

Figure 3:
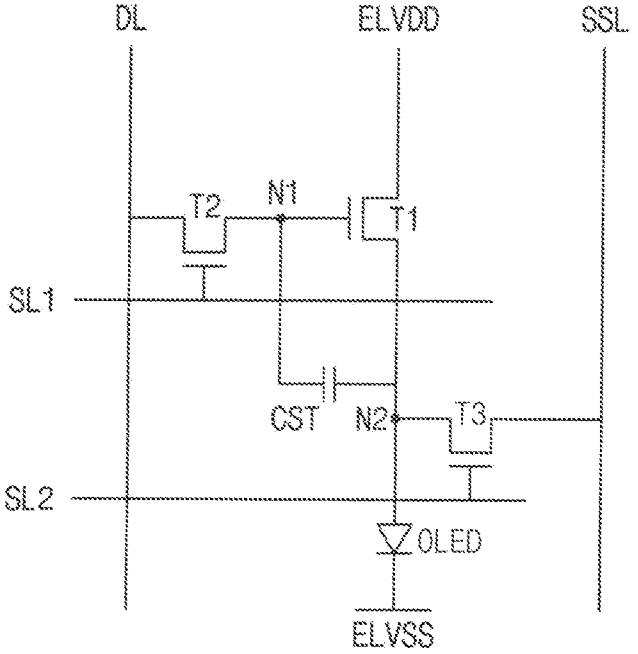
FIG. 3 is a circuit diagram illustrating a pixel included in the display device of FIG. 1.

FIG. 3 is a circuit diagram illustrating a pixel included in the display device of FIG. 1.

Referring to FIGS. 1 and 3, the pixel 120 may include a first transistor T1, a second transistor T2, a third transistor T3, a storage capacitor CST, and an organic light emitting diode OLED. For example, each of the first to third transistors T1, T2, and T3 may be implemented as an N-type transistor or a P-type transistor.

The first transistor T1 may include a control terminal connected to a first node N1, a first terminal connected to a first power source ELVDD, and a second terminal connected to a second node N2. For example, the first transistor T1 may be referred to as a driving transistor.

The second transistor T2 may include a control terminal connected to the first scan line SL1, a first terminal connected to the data line DL, and a second terminal connected to the first node N1. For example, the second transistor T2 may be referred to as a switching transistor.

The third transistor T3 may include a control terminal connected to the second scan line SL2, a first terminal connected to the second node N2, and a second terminal connected to the sensing line SSL. For example, the third transistor T3 may be referred to as a sensing transistor.

The storage capacitor CST may include a first terminal connected to the first node N1 and a second terminal connected to the second node N2.

The organic light emitting diode OLED may include a first terminal connected to the second node N2 and a second terminal connected to a second power source ELVSS. For example, the first terminal of the organic light emitting diode OLED may be an anode terminal, and the second terminal may be a cathode terminal.

The first power source ELVDD may be greater than (or higher than) the second power source ELVSS. The first power source ELVDD may be a high power voltage. The second power source ELVSS may be a low power voltage.

Figure 4:
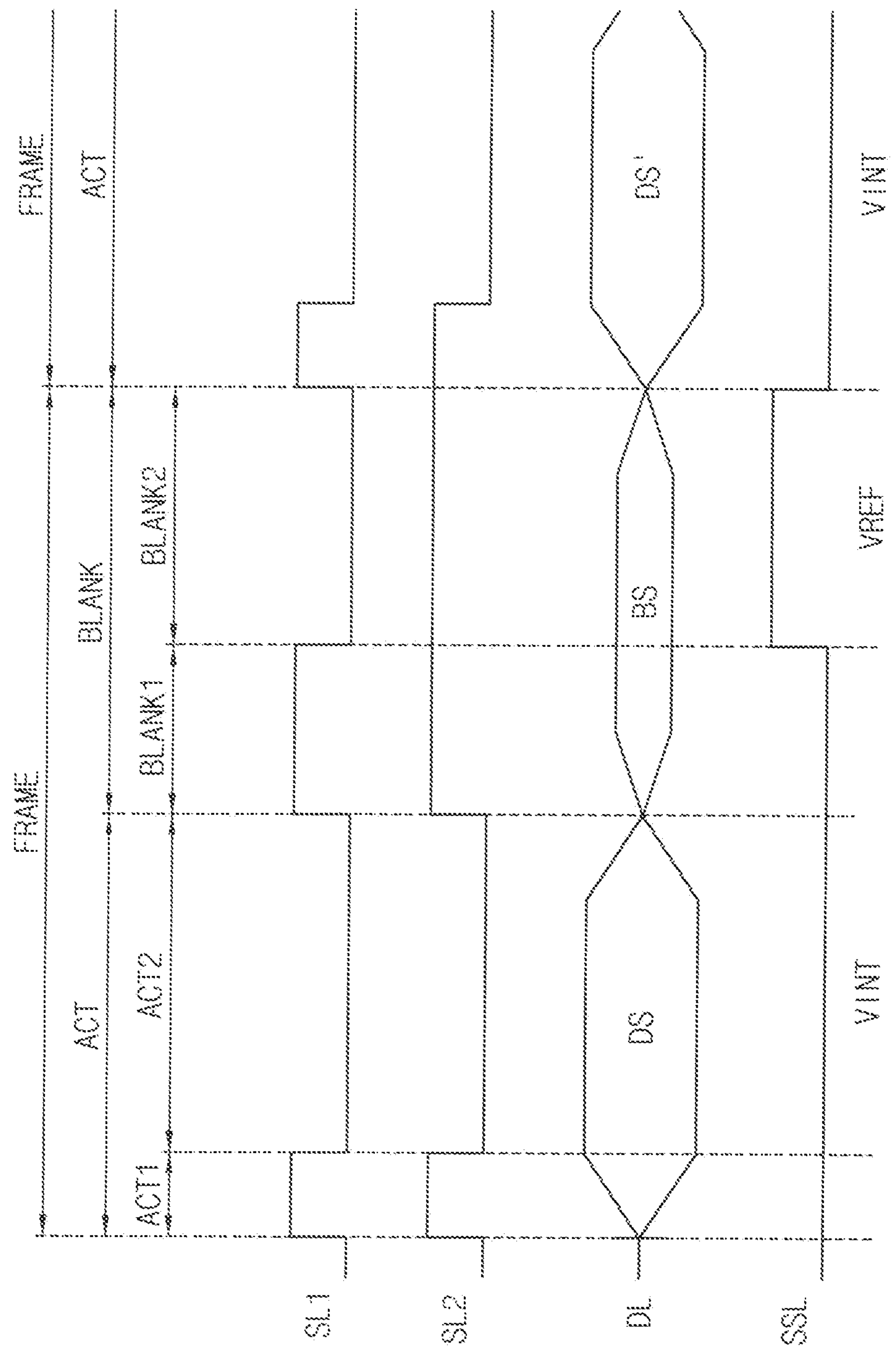
FIG. 4 is a timing diagram illustrating an operation of the display device of FIG. 1.

FIG. 4 is a timing diagram illustrating an operation of the display device of FIG. 1.

Referring to FIGS. 1, 3, and 4, a frame period of the display device 1000 may include an active period ACT and a blank period BLANK following the active period ACT. The data voltage may be provided to the pixels during the active period ACT. The data voltage may not be provided to the pixels during the blank period BLANK.

Lengths of the active period ACT and the blank period BLANK are shown to be substantially the same in FIG. 4, but the length of the active period ACT may be longer than the length of the blank period BLANK.

Only the first scan signal and the second scan signal provided to one pixel row are shown in FIG. 4, but waveforms of the first scan signal and the second scan signal may be sequentially provided to the entire pixel rows while being shifted during the active period ACT.

The active period ACT may include a first active period ACT1 and a second active period ACT2, and the blank period BLANK may include a first blank period BLANK1 and a second blank period BLANK2. During the frame period, a first scan signal may be provided to the first scan line SL1, a second scan signal may be provided to the second scan line SL2, At least one data voltage DS or DS' and a blank data voltage BS may be provided to the data line DL, and an initialization voltage VINT and a reference voltage VREF may be provided to the sensing line SSL.

The first scan signal may have a turn-on voltage during the first active period ACT1 and a turn-off voltage during the second active period ACT2. For example, the turn-on voltage may be a voltage for turning on the second transistor T2, and the turn-off voltage may be a voltage for turning off the second transistor T2.

The second scan signal may have a turn-on voltage during the first active period ACT1 and a turn-off voltage during the second active period ACT2. For example, the turn-on voltage may be a voltage for turning on the third transistor T3, and the turn-off voltage may be a voltage for turning off the third transistor T3.

During the active period ACT, the data voltage DS may be provided to the data line DL. For example, the data voltage DS may be a data voltage generated based on the output image data ODAT. In some embodiments, the initialization voltage VINT may be provided to the sensing line SSL during the active period ACT.

For example, during the first active period ACT1, the second and third transistors T2 and T3 may be turned on. In this case, a voltage (or charge) corresponding to a difference between the data voltage DS and the initialization voltage VINT may be stored in the storage capacitor CST of the pixel 120. The first transistor T1 may generate a driving current according to a voltage difference between the control terminal of the first transistor T1 and the first terminal of the first transistor T1. An emission luminance of the organic light emitting diode OLED may be determined according to the current amount of the driving current.

For example, during the second active period ACT2, the second and third transistors T2 and T3 may be turned off. In this case, a voltage difference between the control terminal and the first terminal of the first transistor T1 may be maintained by the voltage stored in the storage capacitor CST. Accordingly, the current amount of the driving current is maintained, so that the emission luminance of the organic light emitting diode OLED may be maintained.

In some embodiments, the first scan signal may have a turn-on voltage during the first blank period BLANK1 and a turn-off voltage during the second blank period BLANK2. The second scan signal may have a turn-on voltage during the first blank period BLANK1 and the second blank period BLANK2.

During the blank period BLANK, the blank data voltage BS may be provided to the data line DL. For example, the blank data voltage BS may be a sensing voltage for sensing the pixel 120. In some embodiments, the initialization voltage VINT may be provided to the sensing line SSL during the first blank period BLANK1. During the second blank period BLANK2, a reference voltage VREF may be provided to the sensing line SSL. For example, during the second blank period BLANK2, the sensing line SSL may be electrically floating.

For example, the second and third transistors T2 and T3 may be turned on during the first blank period BLANK1. Accordingly, the blank data voltage BS may be provided to the first node N1, and the initialization voltage VINT may be provided to the second node N2. Thereafter, during the second blank period BLANK2, the second transistor T2 may be turned off and the third transistor T3 may be turned on. Accordingly, the reference voltage VREF may be provided to the second node N2. Therefore, a sensing current may flow through a path connecting the first power source ELVDD, the first transistor T1, the second node N2, the third transistor T3 and the sensing line SSL. The sensing circuit 400 may measure the sensing current value IS, which is a current value of the sensing current generated by the first transistor T1, and the compensator 600 may calculate the deterioration weight WP.

The controller 500 may generate the output image data ODAT in which the deterioration weight WP is reflected in the input image data DAT during an active period following the blank period BLANK. The data driver 200 may generate the data voltage DS' based on the output image data ODAT.

For example, a first deterioration degree of the pixel block 110 during the first frame period FRAME1 may be less than a second deterioration degree of the pixel block 110 during the second frame period FRAME2 following the first frame period FRAME1. In other words, a second deterioration weight of the pixel block 110 during the second frame period FRAME2 may be greater than a first deterioration weight of the pixel block 110 during the first frame period FRAME1. As the controller 500 reflects the second deterioration weight greater than the first deterioration weight, the pixel block 110 may emit the same emission luminance during the first frame period FRAME1 and the second frame period FRAME2.

Figure 5:
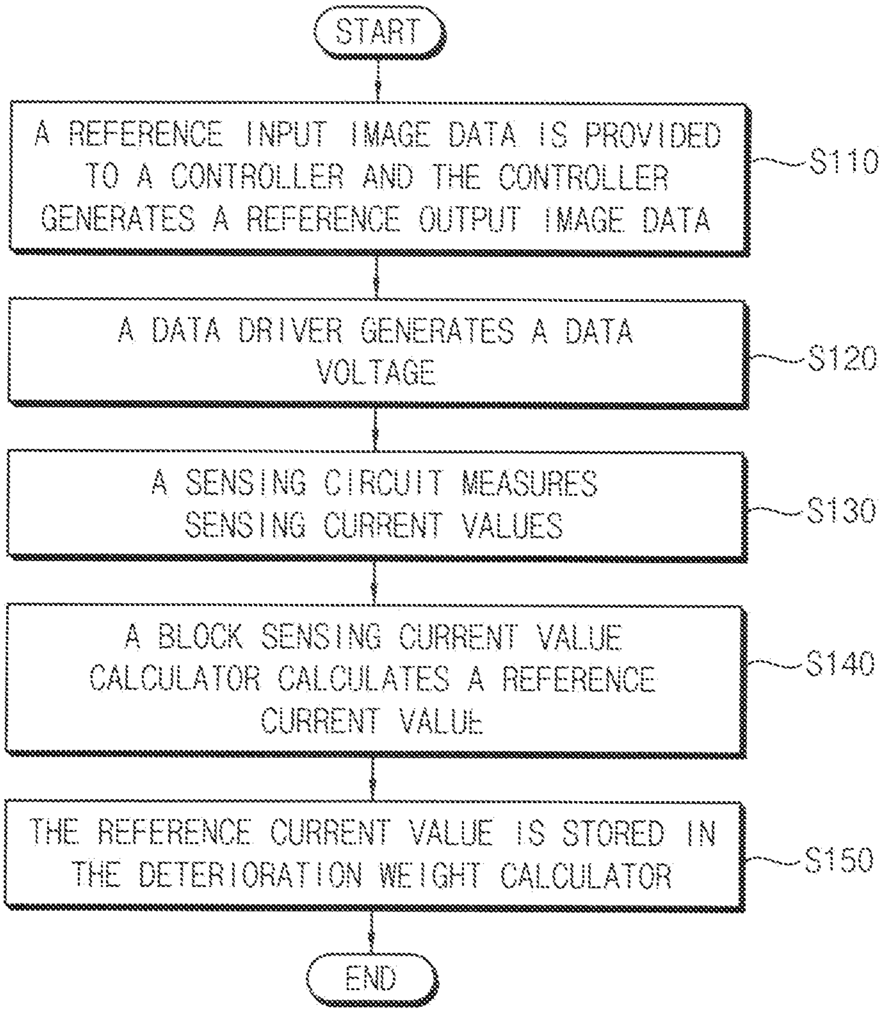
FIG. 5 is a flowchart illustrating an example in which the display device of FIG. 1 acquires a reference current value.

FIG. 5 is a flowchart illustrating an example in which the display device of FIG. 1 acquires a reference current value.

Referring to FIGS. 1 and 5, in order for the display device 1000 to acquire the reference current value IR, the reference input image data may be provided to the controller 500 included in the display device 1000, and the controller 500 may generate reference output image data based on the reference input image data (S110).

The data driver 200 may generate a data voltage based on the reference output image data (S120).

The sensing circuit 400 included in the display device 1000 may measure the sensing current values IS of the pixels 120 included in the pixel block 110 (S130).

The block sensing current value calculator 610 may calculate the block sensing current value of the pixel block 110 based on the sensing current values IS (S140). In an example embodiment, the block sensing current value may be an average value of the sensing current values. In another example embodiment, the block sensing current value may be a maximum sensing current value from among the sensing current values. In some embodiments, because the block sensing current value is a value calculated based on the reference input image data, the block sensing current value may be the reference current value IR.

The reference current value IR may be stored in the deterioration weight calculator 620 (S150).

For example, the reference current value IR may be measured through the reference display device and then stored in the display device 1000. Alternatively, the reference current value IR may be measured and updated each time the display device 1000 is turned on.

Figure 6:
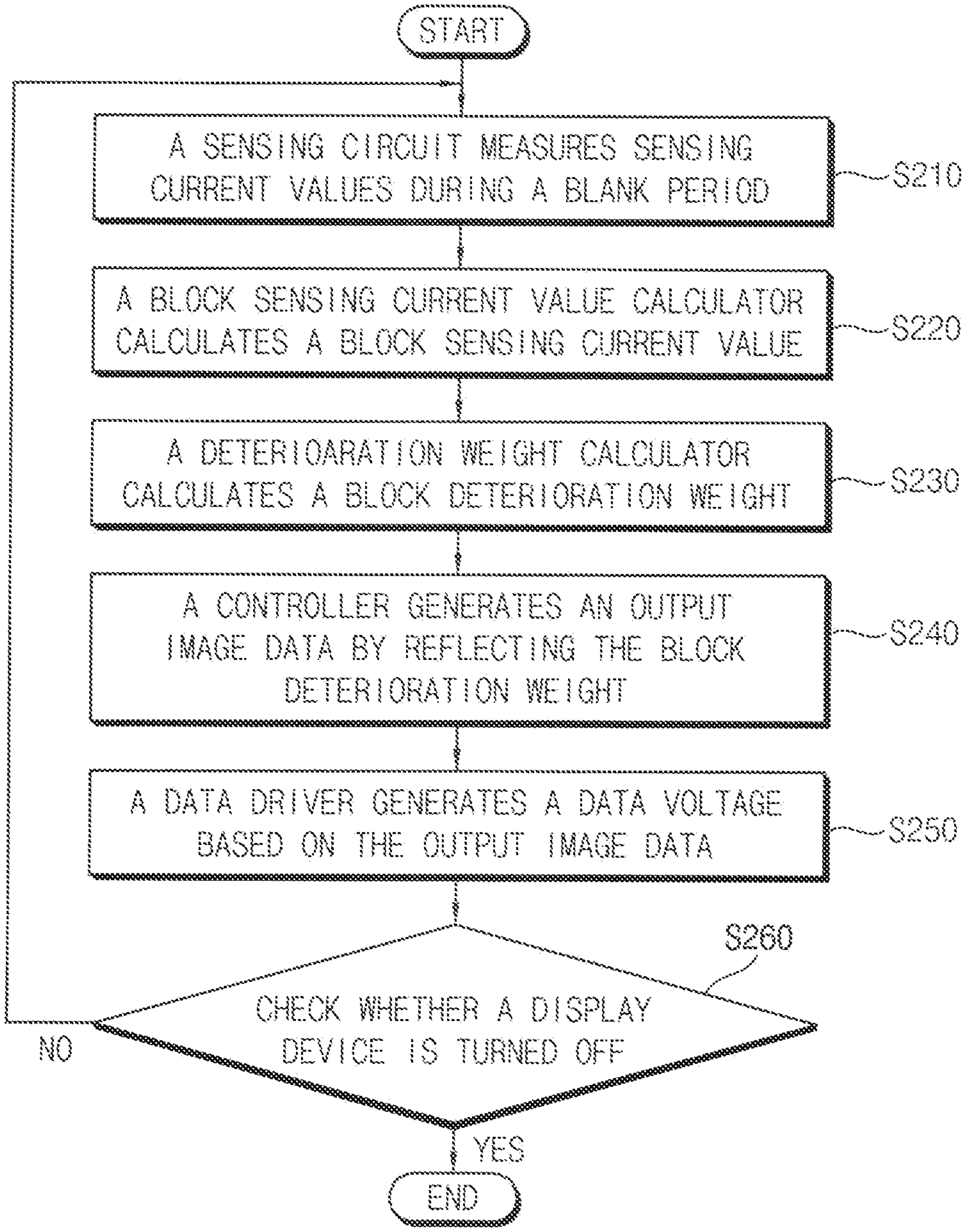
FIG. 6 is a flowchart illustrating an example in which the display device of FIG. 1 compensates for deterioration of a pixel block.

FIG. 6 is a flowchart illustrating an example in which the display device of FIG. 1 compensates for deterioration of a pixel block.

Referring to FIGS. 1, 4, and 6, the sensing circuit 400 included in the display device 1000 may measure the sensing current values IS of the pixels 120 included in the pixel block 110 during the blank period BLANK (S210). For example, the blank data voltage BS may be provided to the pixels 120 during the blank period BLANK, and the blank data voltage BS may be the sensing voltage for sensing the pixel 120.

The block sensing current value calculator 610 may calculate the block sensing current value of the pixel block 110 based on the sensing current values IS (S220). In some embodiments, the deterioration weight calculator 620 may calculate the block deterioration weight based on the block sensing current value and the reference current value IR (S230).

The controller 500 may generate the output image data ODAT by reflecting the block deterioration weight in the input image data IDAT (S240). The data driver 200 may generate the data voltage DS' based on the output image data ODAT during the active period ACT following the blank period BLANK (S250).

The controller 500 may check whether the display device 1000 is turned off (S260). When the display device 1000 is not turned off, the sensing circuit 400 may measure the sensing current values IS during the blank period BLANK following the active period ACT (S260: NO).

Figure 7:
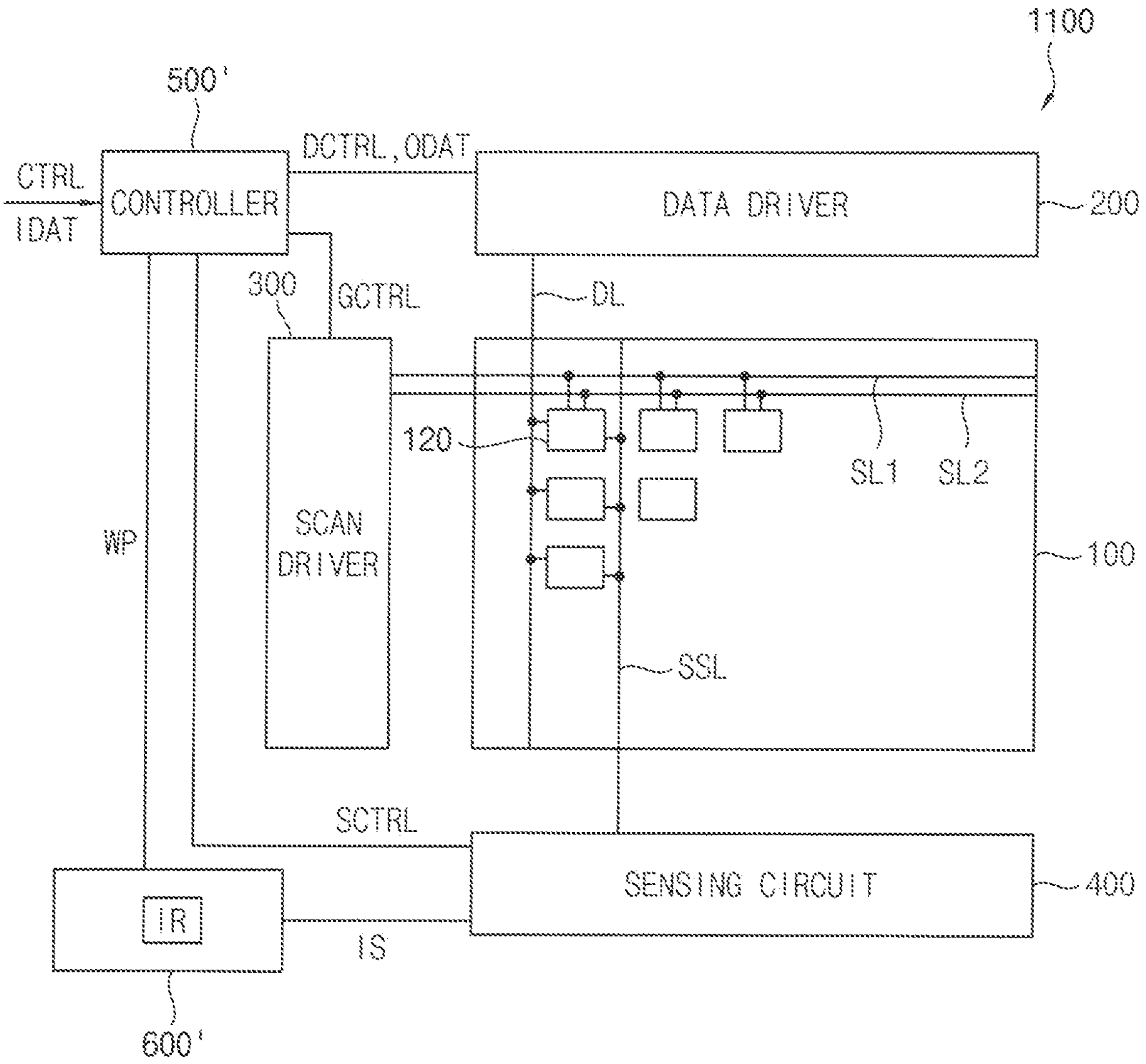
FIG. 7 is a diagram illustrating a display device according to an embodiment.
Figure 8:
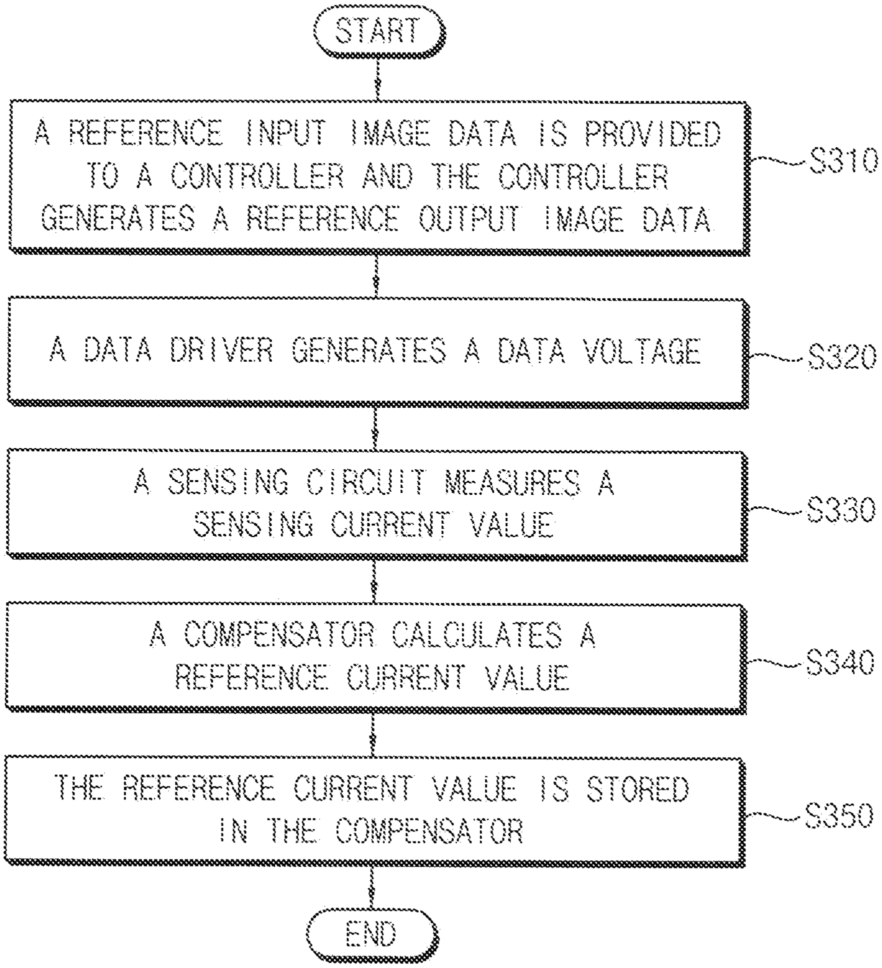
FIG. 8 is a flowchart illustrating an example in which the display device of FIG. 7 acquires a reference current value.
Figure 9:
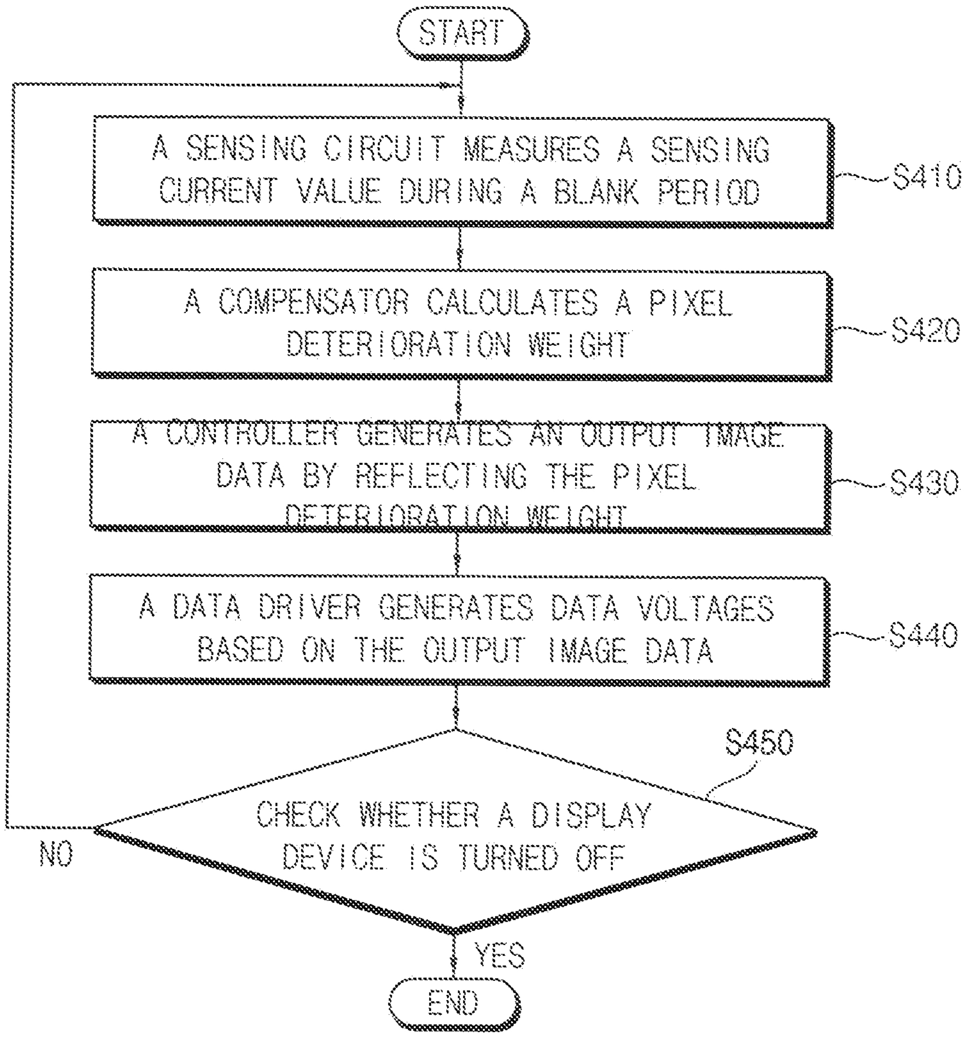
FIG. 9 is a flowchart illustrating an example in which the display device of FIG. 7 compensates for deterioration of a pixel.

FIG. 7 is a diagram illustrating a display device according to an embodiment. FIG. 8 is a flowchart illustrating an example in which the display device of FIG. 7 acquires a reference current value. FIG. 9 is a flowchart illustrating an example in which the display device of FIG. 7 compensates for deterioration of a pixel.

Referring to FIG. 7, a display device 1100 according to an embodiment of the present disclosure may include a display panel 100, a data driver 200, a scan driver 300, a sensing circuit 400, and a driving controller (e.g., a timing controller). The driving controller may include a controller 500' and a compensator 600'. However, the display device 1100 may be substantially the same as the display device 1000 described above except for the controller 500' and the compensator 600'.

The controller 500' may receive input image data IDAT and a control signal CTRL from an external processor (e.g., GPU). For example, the input image data IDAT may be RGB data including red image data, green image data, and blue image data. In some embodiments, the control signal CTRL may include a vertical synchronization signal, a horizontal synchronization signal, an input data enable signal, a master clock signal, and the like.

In some embodiments, the controller 500' may receive a deterioration weight WP from the compensator 600'. In an embodiment, the controller 500' may generate output image data ODAT based on the input image data IDAT and the deterioration weight WP. In some embodiments, the controller 500' may generate a data control signal DCTRL, a gate control signal GCTRL, and a sensing control signal SCTRL, based on the control signal CTRL.

The sensing circuit 400 may measure the sensing current value IS of the pixel 120 based on the sensing control signal SCTRL provided from the controller 500'. For example, the sensing circuit 400 may measure the sensing current value IS of the pixel 120 during the blank period BLANK. For example, the sensing current value IS may indicate a degree of deterioration of the pixel 120. For example, the sensing current value IS may increase as the pixel 120 deteriorates.

The compensator 600' may calculate the deterioration weight WP based on the sensing current value IS and a reference current value IR (e.g., a preset reference currently value IR). The compensator 600' may output the deterioration weight WP to the controller 500'.

In an embodiment, the compensator 600' may calculate a pixel deterioration weight of each of the pixels 120. In other words, the compensator 600' may calculate the pixel deterioration weight for each of the pixels 120. In some embodiments, the controller 500' may generate the output image data ODAT by reflecting the pixel deterioration weight in the input image data IDAT. In this case, the display device 1100 may perform accurate (or substantially accurate) deterioration compensation for each pixel 120.

Referring to FIGS. 7 and 8, in order for the display device 1100 to acquire the reference current value IR, reference input image data may be provided to the controller 500' included in the display device 1100, and the controller 500' may generate reference output image data based on the reference input image data (S310).

The data driver 200 may generate a data voltage based on the reference output image data (S320).

The sensing circuit 400 included in the display device 1100 may measure the sensing current value IS of the pixel 120 (S330).

The compensator 600' may calculate the reference current value IR based on the sensing current value IS (S340). For example, because the sensing current value IS is a value measured based on the reference input image data, the sensing current value IS may be the reference current value IR.

The reference current value IR may be stored in the compensator 600' (S350).

For example, the reference current value IR may be measured through the reference display device and then stored in the display device 1100. Alternatively, the reference current value IR may be measured and updated each time the display device 1100 is turned on.

Referring to FIGS. 7 and 9, the sensing circuit 400 of the display device 1100 may measure the sensing current value IS of the pixel 120 during the blank period BLANK (S410). For example, the blank data voltage BS may be provided to the pixels 120 during the blank period BLANK, and the blank data voltage BS may be the sensing voltage for sensing the pixel 120.

The compensator 600' may calculate the pixel deterioration weight based on the sensing current value IS and the reference current value IR (S420). For example, the pixel deterioration weight may be calculated for each of the pixels 120.

Thereafter, the controller 500' may generate the output image data ODAT by reflecting the pixel deterioration weight in the input image data DAT (S430). The data driver 200 may generate the data voltage DS' based on the output image data ODAT during the active period ACT following the blank period BLANK (S440).

The controller 500' may check whether the display device 1100 is turned off (S450). When the display device 1100 is not turned off, the sensing circuit 400 may measure the sensing current values IS during the blank period BLANK following the active period ACT (S450: NO).

The display device according to embodiments may measure a sensing current for each pixel. In some embodiments, the display device may compensate for a luminance decrease due to deterioration of a pixel by calculating a block deterioration weight for each pixel block or a pixel deterioration weight for each pixel using the sensing currents. In some embodiments, the display device may compensate for the luminance decrease due to deterioration of the pixel in real time according to the degree of use of the pixel by measuring the sensing current for each blank period of the frame period.

Although certain embodiments and implementations have been described herein, other embodiments and modifications will be apparent from this description. Accordingly, the present disclosure is not limited to such embodiments, but rather to the broader scope of the appended claims and various obvious modifications and equivalent arrangements as would be apparent to a person of ordinary skill in the art.

What is claimed is:

1. A display device comprising:

a display panel comprising a plurality of pixels;

a sensing circuit to measure a sensing current value of each of the pixels during a blank period, wherein a frame period comprises an active period and the blank period following the active period, wherein the sensing circuit is to measure the sensing current value based on an initialization voltage supplied through a sensing line to the pixels during the active period and a first blank period of the blank period and a reference voltage supplied through the sensing line to the pixels during a second blank period of the blank period, the first period being adjacent the active period, and the initialization voltage being different from the reference voltage;

a compensator to calculate a deterioration weight based on the sensing current value and a reference current value; and a controller to generate output image data by applying the deterioration weight to input image data, wherein each of the pixels further comprises:

a first transistor comprising a control terminal connected to a first node, a first terminal connected to a first power source, and a second terminal connected to a second node;

a second transistor comprising a control terminal connected to a first scan line, a first terminal connected to a data line, and a second terminal connected to the first node;

a third transistor comprising a control terminal connected to a second scan line, a first terminal connected to the second node, and a second terminal connected to the sensing line; and an organic light emitting diode comprising a first terminal connected to the second node and a second terminal connected to a second power source, wherein the blank period comprises the first blank period and the second blank period following the first blank period, and wherein a turn-on voltage for turning on the second transistor is provided to the first scan line during the first blank period, and a turn-off voltage for turning off the second transistor is provided to the first scan line during the second blank period.

2. The display device of claim 1, wherein the compensator comprises:

a block sensing current value calculator to calculate a block sensing current value of a pixel block based on the sensing current values, wherein the pixel block comprises pixels from among the plurality of pixels.

3. The display device of claim 2, wherein the block sensing current value is an average value of the sensing current values of the pixels in the pixel block.

4. The display device of claim 2, wherein the block sensing current value is a maximum sensing current value from among the sensing current values of the pixels in the pixel block.

5. The display device of claim 2, wherein the compensator comprises:

a deterioration weight calculator to calculate a block deterioration weight of the pixel block based on the block sensing current value and the reference current value.

6. The display device of claim 5, wherein the controller is to generate the output image data by applying the block deterioration weight to the input image data.

7. The display device of claim 6, wherein the pixel block has a same emission luminance during a first frame period and a second frame period following the first frame period, and wherein the block deterioration weight of the second frame period is greater than the block deterioration weight of the first frame period.

8. The display device of claim 1, wherein the deterioration weight is calculated based on a ratio of the sensing current value and the reference current value.

9. The display device of claim 1, wherein a turn-on voltage for turning on the third transistor is provided to the second scan line during the blank period.

10. The display device of claim 1, wherein the initialization voltage is provided to the sensing line during the first blank period, and the reference voltage is provided to the sensing line during the second blank period.

11. The display device of claim 1, wherein the compensator is to calculate a pixel deterioration weight of each of the pixels based on the sensing current value of each of the pixels and the reference current value.

12. The display device of claim 11, wherein the controller is to generate the output image data by applying the pixel deterioration weight to the input image data.

* * * * *